United States Patent [19]

Masak

[11] 4,370,655

[45] Jan. 25, 1983

[54] COMBINED SIDE LOBE CANCELLER AND FREQUENCY SELECTIVE LIMITER

[75] Inventor: Raymond J. Masak, East Northport, N.Y.

[73] Assignee: The United States of America as represented by the Secretary of the Army, Washington, D.C.

[21] Appl. No.: 221,737

[22] Filed: Dec. 31, 1980

[51] Int. Cl.³ .................................................. H04B 7/08

[52] U.S. Cl. .................................................. 343/100 LE

[58] Field of Search .................................. 343/100 LE

[56] References Cited

U.S. PATENT DOCUMENTS

| | | | |
|---|---|---|---|
| 2,938,206 | 5/1960 | Davis et al. | 343/100 LE X |
| 3,832,711 | 8/1974 | Grant et al. | 343/100 LE X |
| 4,097,866 | 6/1978 | Frost et al. | 343/100 LE |
| 4,146,889 | 3/1979 | Brennan et al. | 343/100 LE X |
| 4,152,702 | 5/1979 | Piesinger | 343/100 LE X |
| 4,177,464 | 12/1979 | Masak | 343/100 LE |
| 4,204,211 | 5/1980 | Cavelos | 343/100 LE |
| 4,286,268 | 8/1981 | Daniel et al. | 343/100 LE |

*Primary Examiner*—Malcolm F. Hubler
*Attorney, Agent, or Firm*—Nathan Edelberg; Sheldon Kanars; Jeremiah G. Murray

[57] ABSTRACT

A radar system having means for effectively eliminating or cancelling interfering signals characterized by the side lobes of the radar antenna received signals. An adaptive side lobe canceller system is combined with a frequency selective limiter such that the adaptive side lobe canceller is sampled by the output of the frequency selective limiter to derive a weighting signal from the adaptive control circuit. The weighting signals effectively provide simultaneous cancellation of both broad and narrow band interfering side lobe signals.

8 Claims, 3 Drawing Figures

COMBINED SIDELOBE CANCELLER AND FREQUENCY SELECTIVE LIMITER

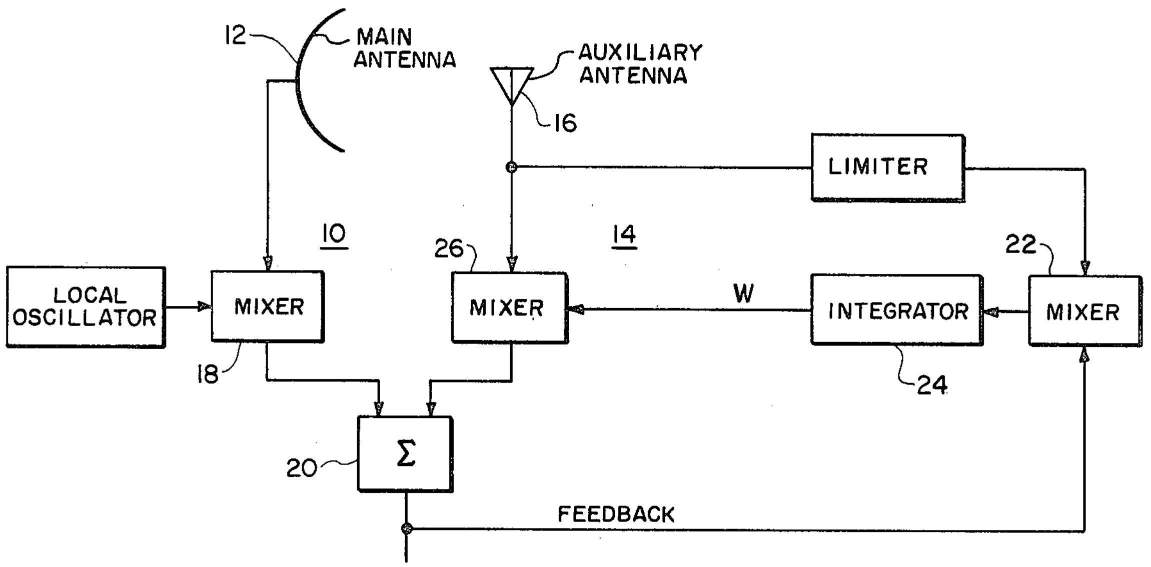
FIG. 1 (PRIOR ART) ADAPTIVE SIDELOBE CANCELLER
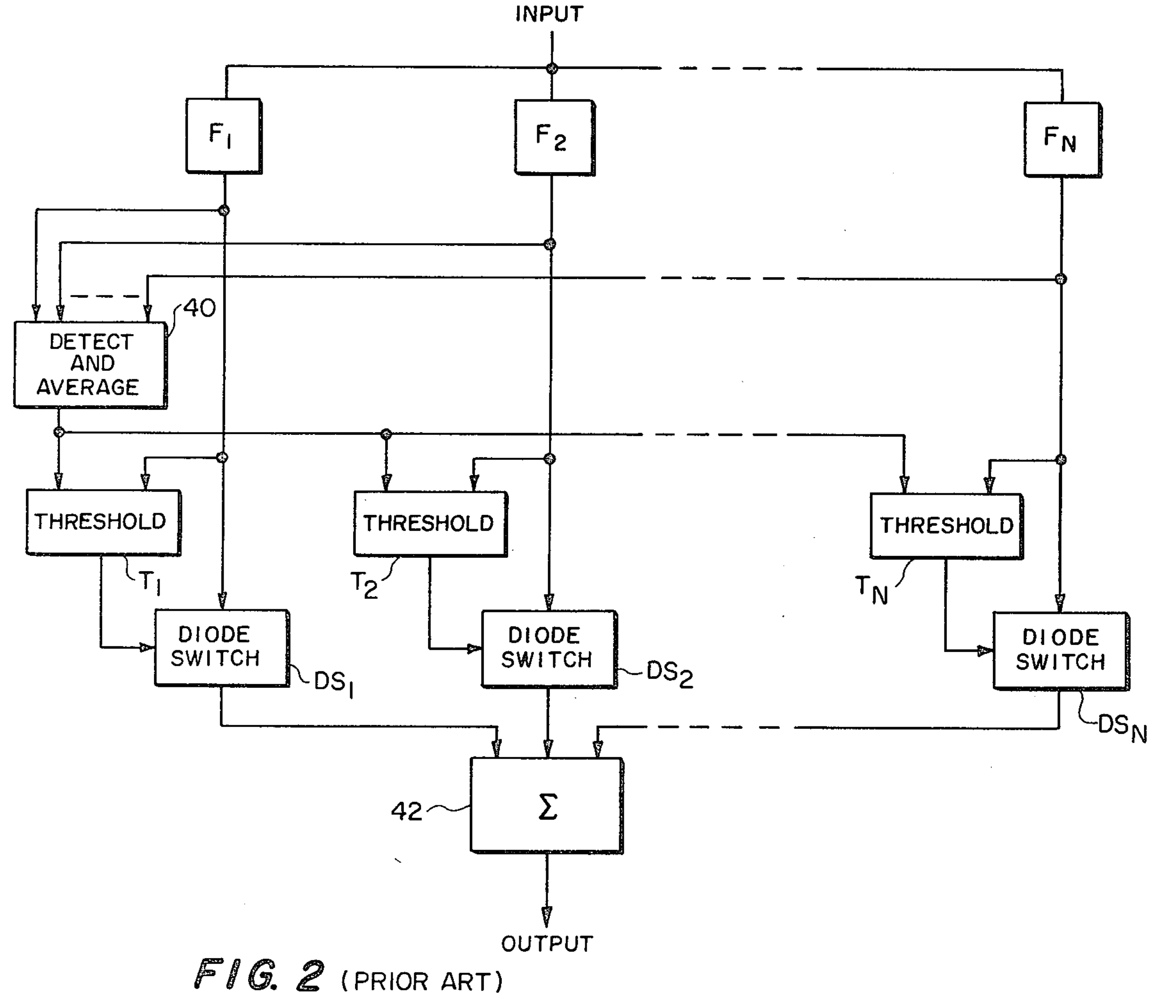
FIG. 2 (PRIOR ART)

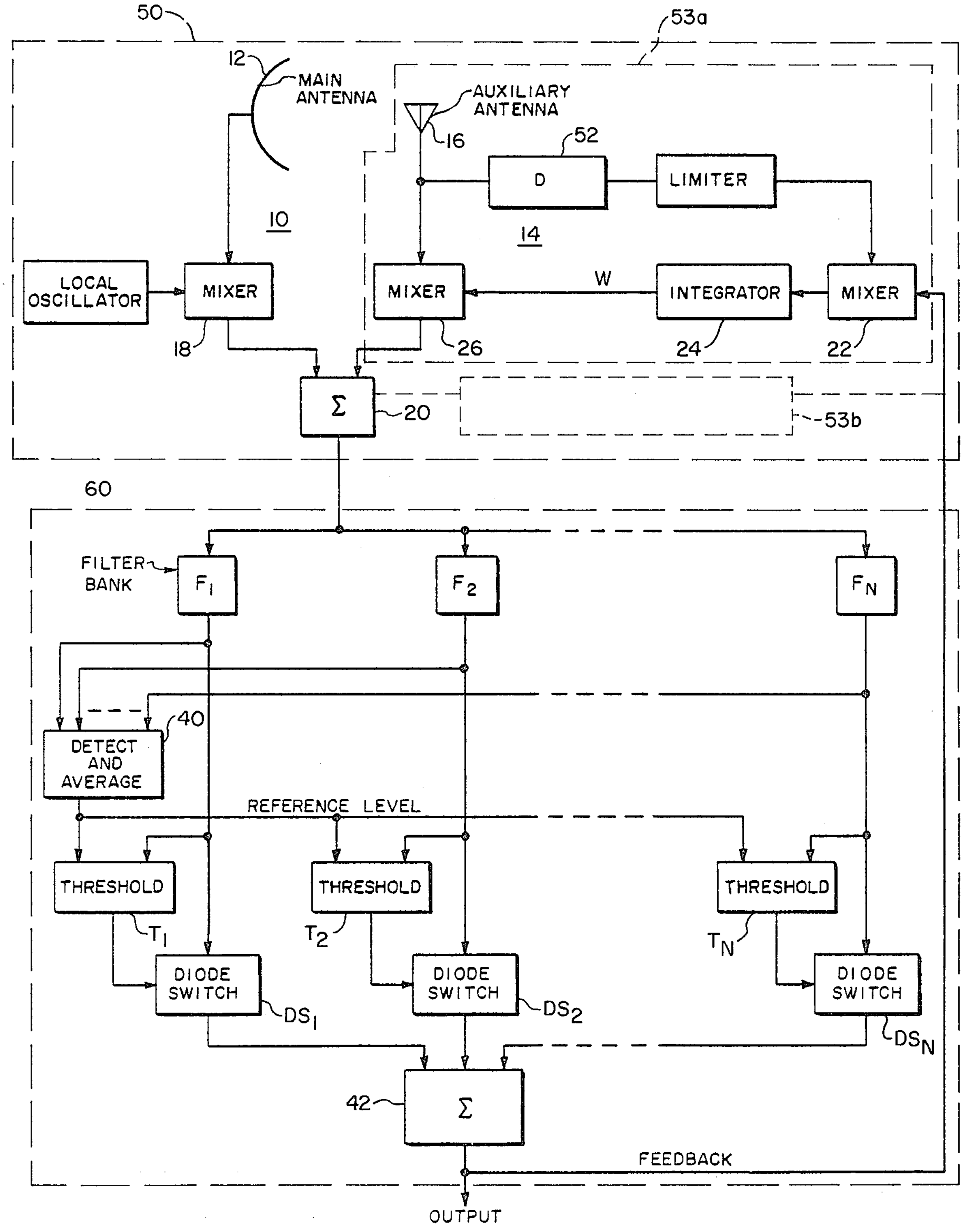
FIG. 3 COMBINED SIDELOBE CANCELLER AND FREQUENCY SELECTIVE LIMITER

COMBINED SIDE LOBE CANCELLER AND FREQUENCY SELECTIVE LIMITER

The invention described herein may be manufactured and used by or for Governmental purposes without the payment of any royalties thereon or therefor.

BACKGROUND OF THE INVENTION

The present invention relates to improvements in radar systems and more particularly to improved techniques for eliminating or cancelling interference introduced into the side lobes of an ECCM radar antenna from multiple interfering signal sources.

Radar antenna systems, including those adapted for ECCM techniques, have characteristics that include a main lobe for receiving the desired information, and a plurality of side lobes at various angles relative to the main lobe. Due to the nature of an antenna, information received in a side lobe is indistinguishable from information received in the main lobe, and thus renders the antenna highly susceptible to interference from unwanted signals or information. The problem is particularly acute in radar systems where the presence of side lobes makes it possible for a single noise jammer to be effective against a radar from any angle of azimuth. The problem becomes even more acute when multiple interference or jamming sources are used against a radar and directed from a variety of directions simultaneously. Side lobe cancellation is a fundamental approach to eliminating interference in received signals, and has been used successfully to eliminate the interference introduced from a single jamming source. One such system uses an adaptive side lobe canceller system well known in the art. In general, such systems use a signal received by an auxiliary omnidirectional antenna to cancel the interference signal received in the side lobe of the primary directional antenna. In ECCM radar systems where the desired signal is usually broadband, such as a short radar pulse, chirp pulse, or spread spectrum signal, and interference is caused by a narrow band signal, a channelized frequency selective limiter circuit is utilized for suppressing a cw or narrow band interfering signal. However, in such prior art broad band ECCM systems there is no provision for responding to wide band interfering signals which are unaffected by the frequency selective limiter circuit. Accordingly, the present invention has been developed to provide an ECCM radar system wherein both wide band and narrow band interfering signals are readily cancelled or eliminated.

SUMMARY OF THE INVENTION

It is an object of the present invention to provide an interference suppression system that has all the advantages of similarly employed techniques and none of the disadvantages.

It is another object of the present invention to provide a combined side lobe canceller and frequency selective limiter having simultaneous capability for cancelling wide and narrow band side lobe signals.

In accordance with the present invention there is provided a side lobe canceller system for a radar system having a main directional antenna and auxiliary omnidirectional antenna. An adaptive side lobe canceller system is in circuit with the main and auxiliary antennas, and includes a first summing network. Also included is a frequency selective limiter system responsive to the output of the first summing network and which includes a second summing network. The adaptive side lobe canceller system is responsive to, and sampled by, the output of the second summing network whereby a weighting signal is produced and applied to the first summing network for simultaneous cancellation of side lobe interfering signals in both broad and narrow band received signals.

BRIEF DESCRIPTION OF THE DRAWINGS

FIG. 1 is a block diagram of a conventional adaptive side lobe canceller system.

FIG. 2 is a block diagram of a prior art frequency selective limiter; and

FIG. 3 is a block diagram of the present invention.

DETAILED DESCRIPTION OF THE INVENTION

A prior art adaptive side lobe canceller system is shown in FIG. 1. The system includes a conventional radar system 10, including a main directional antenna 12, and an adaptive control loop 14, having an auxiliary omnidirectional antenna 16. The interfering signal is received by both the main antenna 12 and the auxiliary antenna 16. The signal from main antenna 12 is applied to a mixer 18, the output of which is applied as one input to summing network 20. A second input to summing network 20 is provided from the output of adaptive control loop 14 which, in turn, is a function of a weighting signal w responsive to a feedback signal from summing network 20.

The theory of such adaptive control loops is well known in the art, and will therefore be described briefly. A feedback or sampling signal from summing network 20 is multiplied or mixed with the auxiliary antenna signal in first mixer 22. The output of first mixer 22 is applied to an integrating network 24 to produce the weighting signal w which, when combined in second mixer 26 with the signal from auxiliary antenna 16, will provide the second input to summing network 20. The two inputs to summing network 20 will combine to cause the auxiliary antenna signal to cancel the interfering signal received in the main antenna channel. Thus, effectively, the adaptive control loop weighting signal w is controlled by the feedback from the output of summing network 20 and the output from summing network 20 provides only the desired signal information. Adaptive side lobe cancellers as herein above described, respond to wide band interfering signals, but are not effective for interference caused by narrow band signals.

A prior art frequency selective limiter is shown in FIG. 2. Referring now to FIG. 2, the incoming signal is divided into a plurality of channels, each channel having a narrow band filter indicated at $F_1$, $F_2$, . . . $F_n$, as shown. A sample of each channel is discretely applied to a detect and average network 40 to develop a signal representative of the average input energy over the entire system passband. Each channelized frequency component is compared to the average input energy signal in discrete threshold detector networks $T_1$, $T_2$, . . . $T_n$. If an individual channelized component is greater than the average input energy signal by a prescribed amount, that particular channel is disconnected by means of an associated diode switch. Such diode switches are shown at Ds, $Ds_2$, . . . $D_n$, respectively. If the individual diode switches Ds, $Ds_2$, . . . $Ds_n$ are normally in the open or gated position, and if the above noted criteria for the individual channelized component is not met, then such individual channelized components will pass through their respective diode switches to a summing network 42. In such systems, cw or narrow band interfering signals are suppressed by deactivating the individual frequency channel containing the interfering signal.

Referring now to FIG. 3, a system according to the present invention is shown which provides simultaneous ECCM capability for narrow band and broad band signals. Like numerals and letters have been used to designate like elements throughout. The system is composed of the adaptive side lobe canceller system of FIG. 1 shown in block 50 including one or more adaptive control loops 53*a*, 53*b*, and the frequency selective limiter of FIG. 2 shown in block 60. The input to the frequency selective limiter 60 is derived from the summing network 20 of adaptive side lobe canceller system 50. The feedback or sampling input to adaptive loop 14 is derived from the output of frequency selective limiter summing network 42. A delay circuit 52 is included in the adaptive control circuit 14 to compensate for the delay experienced by the feedback signal in the frequency selective limiter 60. Both the adaptive side lobe canceller system 50 and the frequency selective limiter 60 operate as herein above explained. However, since the feedback for the adaptive control circuit 14 is sampled from the output of frequency selective limiter 60, the adaptive side lobe canceller system 50 does not respond to narrow band interfering signals. The adaptive side lobe canceller system 50 therefore only responds to wideband interfering signals which are unaffected by the channelized frequency selective limiter 60. The combined system as shown therefore provides simultaneous ECCM capability for narrow band and broad band signals not available in prior art systems.

I claim:

1. A side lobe interfering signal canceller system for an ECCM radar system having a main antenna and at least one auxiliary antenna comprising:

an adaptive side lobe interfering signal canceller system in circuit with said main and auxiliary antennas and including a first summing network coupled to said main and auxiliary antennas and at least one adaptive control loop;

and a frequency selective system connected in series with the output of said first summing network and including a second summing network providing a system output and a feedback signal, said feedback signal being coupled to said adaptive control loop;

said adaptive side lobe canceller being responsive to the feedback signal of said second summing network whereby a weighting signal is generated and applied to said first summing network for cancelling the side lobe interfering signals.

2. The system in accordance with claim 1 wherein said adaptive control loop is coupled between said auxiliary antenna and said first summing network.

3. The system in accordance with claim 2 wherein said frequency selective system includes means for selectively producing discrete narrow band channels over the entire pass band.

4. The system in accordance with claim 3 and further including means for sampling each channel to develop a signal representative of the average input energy over the entire system pass band.

5. The system in accordance with claim 4 wherein said frequency selective system further includes means for gating only those of said discrete channels having an energy component greater than said average input energy by a predetermined amount.

6. The system in accordance with claim 5 wherein said second summing network is responsive to said gated discrete channels and having its output fed back to said adaptive control loop to control the magnitude of said weighting signal.

7. The system in accordance with claim 6 wherein said gating means comprise diode switches.

8. The system in accordance with claim 2 wherein said adaptive control loop includes means for delaying the signal received by said auxiliary antenna to compensate for delay of said feedback signal in said frequency selective system.

* * * * *